(12) United States Patent
Clark

(10) Patent No.: US 6,794,018 B2
(45) Date of Patent: Sep. 21, 2004

(54) PACKAGING ARTICLE

(75) Inventor: Richard Clark, Lebanon, NJ (US)

(73) Assignee: Newark Group Industries, Inc., Cranford, NJ (US)

( * ) Notice: Subject to any disclaimer, the term of this patent is extended or adjusted under 35 U.S.C. 154(b) by 0 days.

(21) Appl. No.: 10/287,156

(22) Filed: Nov. 4, 2002

(65) Prior Publication Data
US 2004/0086692 A1 May 6, 2004

(51) Int. Cl.$^7$ .................... B32B 3/20; B65D 85/48; B65D 25/00
(52) U.S. Cl. .................... 428/188; 428/72; 428/78; 229/931; 206/453; 206/586; 220/62.1; 220/642
(58) Field of Search .................... 428/72, 76, 77, 428/78, 178, 188; 229/931; 206/453, 484, 586; 220/62.1, 641, 642, 643, 644

(56) References Cited

U.S. PATENT DOCUMENTS

| | | | | |
|---|---|---|---|---|
| 1,875,497 A | * | 9/1932 | Richardson | 206/586 |
| 2,253,219 A | * | 8/1941 | Alexander | 144/309 |
| 3,804,237 A | * | 4/1974 | Christenson et al. | 206/45.3 |
| 4,545,482 A | * | 10/1985 | Novatny | 206/320 |
| 5,232,762 A | * | 8/1993 | Ruby | 428/167 |

* cited by examiner

Primary Examiner—Donald J. Loney
(74) Attorney, Agent, or Firm—Stroock & Stroock & Lavan LLP

(57) ABSTRACT

A packaging article constructed in accordance with the invention is provided which is formed and shipped in a flat shape, and which may be converted into a rigid L-shaped, U-shaped, triangular or square/rectangular shipping or storage container for the protection of articles during shipping and storage. The packaging article is constructed using a rigid but pliable member to allow for ease in formation and handling, but after formation into an L-shaped, U-shaped or other shaped shipping or storage container, to produce a rigid storage structure or tube.

14 Claims, 3 Drawing Sheets

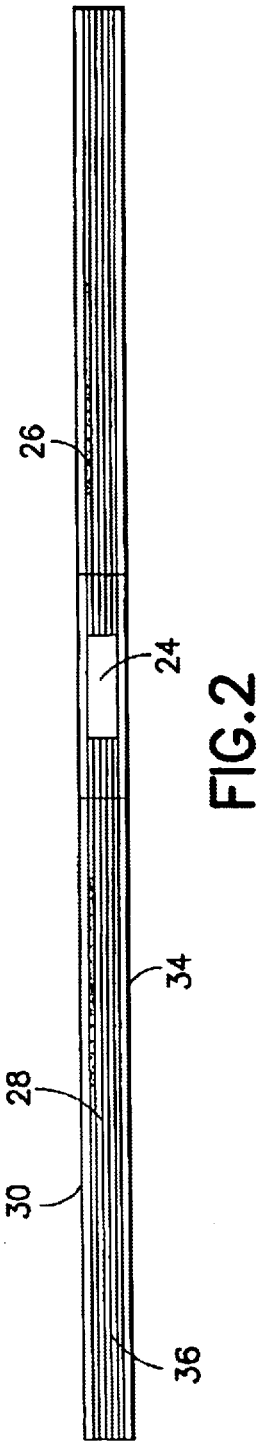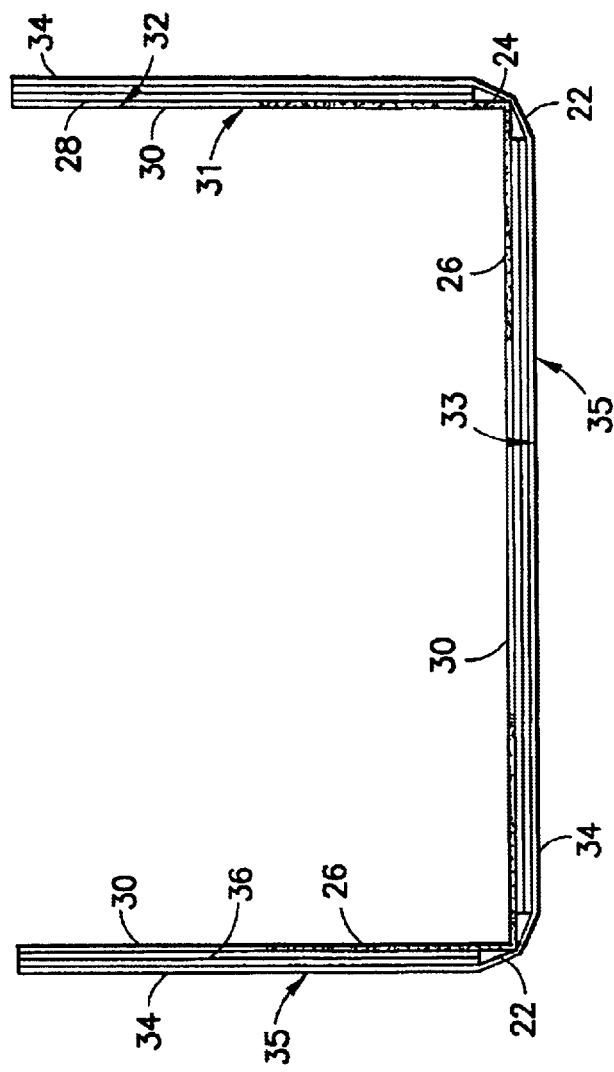

PACKAGING ARTICLE

FIELD OF THE INVENTION

This invention relates to an improved packaging item for securing materials and, more specifically, elongated articles, such as glass rods, pipes, lumber, Venetian blinds and the like for transporting, storing or shipping, and, in particular, to a space-saving packaging article container which may be shipped to a user in a flat position and then formed into a U-shaped, L-shaped, triangular or other shaped container.

BACKGROUND OF THE INVENTION

Packaging and other shipping containers are typically constructed of corrugated materials and the like. In the prior art, typically, a preformed U-shaped angle board is used. The angle board material may be formed by layering paperboard that is formed around a mold to give the board the U-shaped appearance. Layer after layer of this paperboard is applied to the U-shaped mold to form a U-shaped, rigid, multi-layer paperboard packaging product.

Using such a method, a rigid packaging article is produced, which will protect the contents inside. Such articles may be formed in any length, and for that matter, can be formed in any size and, therefore, can accommodate contents of many varied lengths and sizes. Of course, the larger the U-shaped board, the less rigid the final packaging article.

While such rigid U-shaped packaging articles have been sufficient, they have also had a number of drawbacks. For instance, because the U-shaped packaging article is rigid, like sized packaging articles will not easily nest within each other, thereby increasing the shipping volume. As such, the packaging articles take up as much space empty as they do fully loaded. This exacts an unnecessary added expense, because warehouse space and space on a shipping vessel is costly.

Other known packaging articles include those having a tri-sectional structure that can be shipped in a flat configuration and later formed into a U-shaped structure. A major drawback of such tri-sectional packaging articles is that the side-walls of the packaging article must be held in a jig to keep the side-walls erect during loading of the materials or the structures must be constructed with an intricate array of layers in order to hold the sides up. The former process adds expense and complication during the loading phase, while the latter adds expense during manufacturing of the packaging article. In either case, the expenses incurred are eventually passed to the consumer. It is, thus, desirable to provide a strong and pliable container that can be shipped in a flat configuration, so as to take up less space, and that can more easily and effectively be formed into a multi-shaped container for shipping or storing a variety of materials.

SUMMARY OF THE INVENTION

The present invention is directed to a packaging article which is formed so as to be shipped and stored in a flat state, thereby minimizing the space used by said article, and then be converted into a rigid multi-shaped shipping or storage container for the protection of various articles during transport or storage. The packaging article is constructed to allow for ease in formation and handling, and offers strength and flexibility in that it may be formed into a vast variety of shapes to accommodate various sized and shaped materials for shipping or storage.

In an exemplary embodiment of the invention, the packaging article is formed with a plurality of support layers disposed between a pair of sealing layers. Each support layer is formed using a plurality of reinforcement layers which are preferably adhesively bonded together to add strength to the support layer structure. Preferably, at least three such support layers are positioned in a plane and spaced apart so as to form a collapsible channel therebetween.

The support layers are positioned in spaced apart relation and bound together by overlaying one of the pair of sealing layers on each side of the support layers on each side of the support layers. In the exemplary embodiment presently being described, two collapsible channels are formed on both sides of the middle support layers. Thus, the collapsible channels are defined by, on the one hand, the first and second support layers, and on the other, two of the support layers. Each collapsible channel is reinforced by a strong, but pliable, shaping member to add strength and support to the packaging article. The collapsible channel further functions to permit the two outer support members to articulate about an axis passing through the collapsible channel, such that a user can shape the packaging article depending on the user's packaging needs. As will be described in greater detail below, the pliable support members allow the packaging article to maintain a defined shape as desired by the user.

During use, the outer support layers may be articulated so as to form a corner at the collapsible channel which acts as a hinge, to form an acute angle, a right angle or an obtuse angle depending on the desired shape of the final packaging article. As the support layers articulate, the pliable reinforcement members become angled to substantially match the angle of the outer support members in relation to the middle support member. Thus, the structure maintains its shape due to the pliable nature of the shaping member. After use, the packaging article is easily flattened for storage, thereby minimizing the amount of space required for storage.

In another exemplary embodiment, the packaging article structure comprises a support layer that is formed using a single layer of material, having desired strength and weight properties, disposed between the coupling layer and the sealing layer and adhesively bonded thereto. The support layers are situated so as to form a collapsible channel therebetween; each collapsible channel being reinforced by a strong but pliable shaping member to add strength and support to allow the packaging article to maintain a defined shape as desired by the user.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference numerals depict like elements throughout the several views:

FIG. 2 is a side elevational view of a portion of the paperboard structure constructed in accordance with the invention in a flat position;

FIG. 3 is a side elevational view of the paperboard structure constructed in accordance with the invention in a U-shaped orientation;

DETAILED DESCRIPTION OF THE EMBODIMENTS

The present invention is directed to a packaging article 10 that can be manipulated into a variety of shapes for storing, shipping or transporting a variety of materials.

Figure 1:
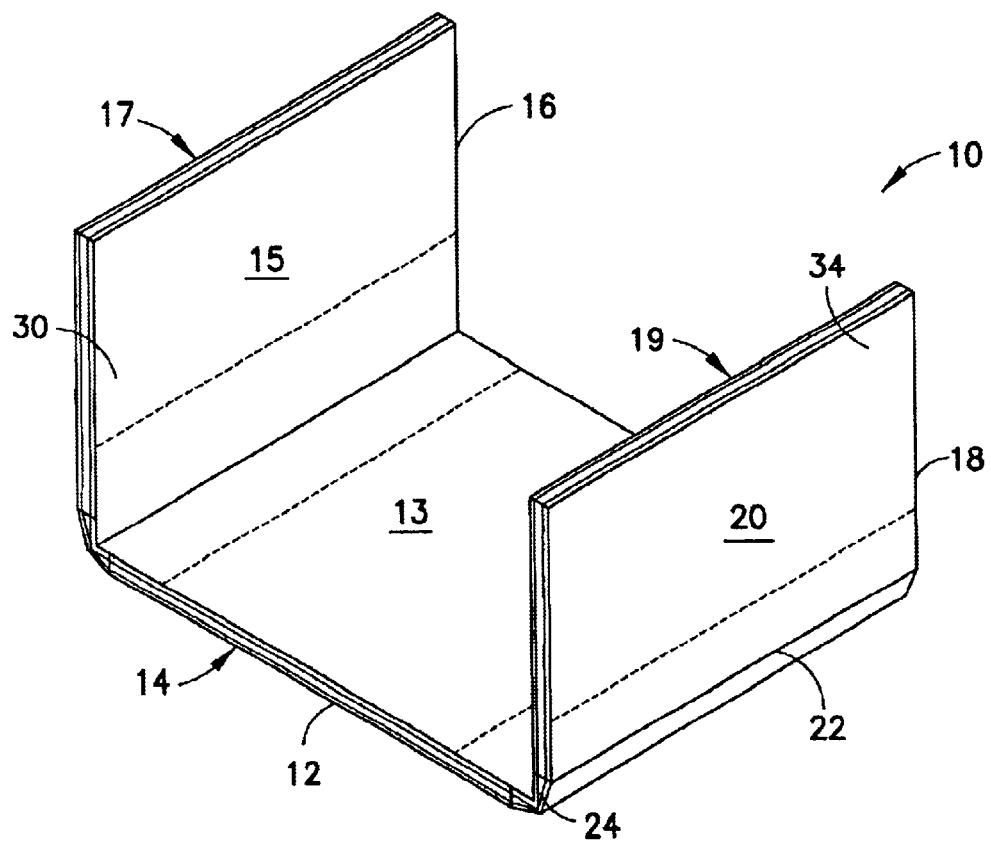
FIG. 1 is a perspective view of a portion of a U-shaped paperboard structure constructed in accordance with the invention.
Figure 5:
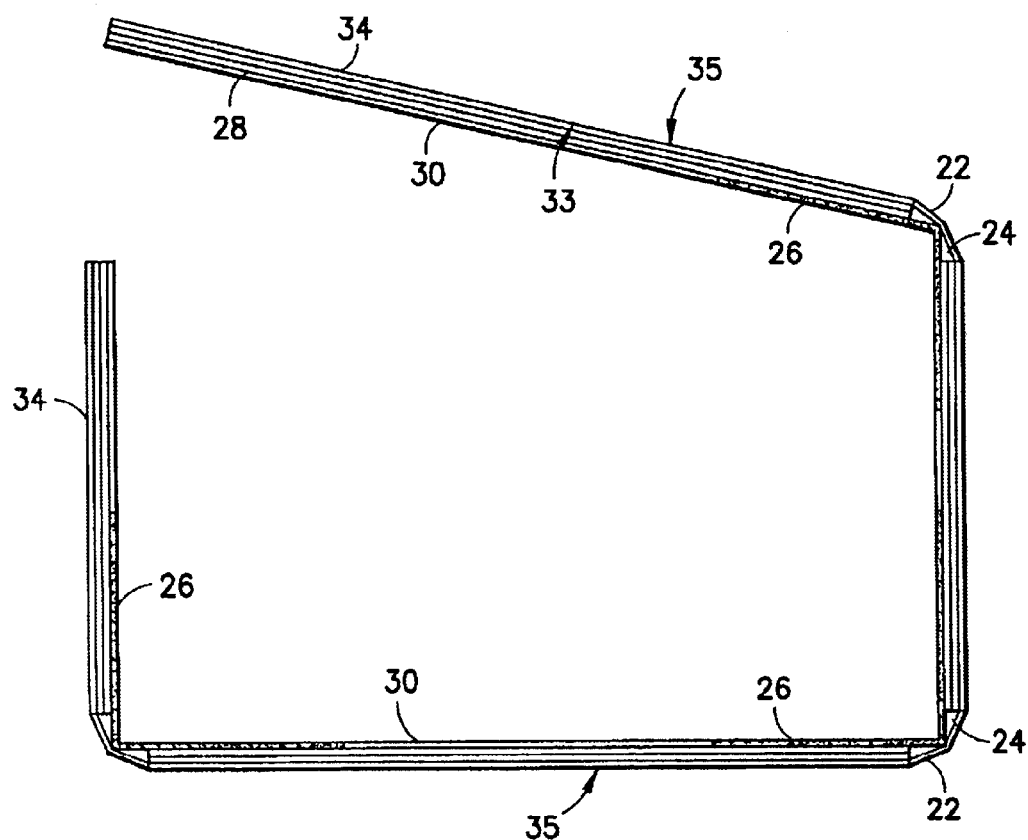
FIG. 5 is a side view of a packaging article having four support member structures each articuable so as to form a closed packaging article.

Referring now to the drawings in detail, FIG. 1 depicts a packaging article product 10 in a U-shaped configuration for storing or shipping materials, as constructed in accordance with an exemplary embodiment of the invention. Packaging article 10 generally comprises at least three support members 28 positioned in spaced apart relation and bound together by first and second sealing layers 30, 34. The relative position of the support members 28 and the sealing layers 30, 34 define a collapsible channel 24, which permits the two outer support members 28" and 28" to articulate about an axis (X) passing longitudinally through the collapsible channels 24. Thus, as depicted in FIG. 1, the packaging article 10 can be formed to take a U-shape. A strong, but pliable, reinforcement member 26 (shown in FIG. 2) is preferably positioned and fixed between other first sealing layer 30 and the support members 28 so as to overlie and further define the collapsible channels 24. In an exemplary embodiment, as shown in FIGS. 3 and 5, the reinforcement member 26 is positioned such that, when the packaging article 10 is bent into the U-shape, the member 26 is nearest the outer sealing layer 34. Of course, in an alternate embodiment, the reinforcement member 26 can be positioned nearer the inner sealing layer 30. Although a pair of reinforcement members 26 are shown in the FIGS., one skilled in the art will recognize that a single reinforcement member 26 that extends through both collapsible channels may be used. The reinforcement member 26 also preferably extend throughout the packaging so as to substantially overlie the whole of the collapsible channels 24, as shown in FIG. 2.

Preferably, the support members 28 are formed by layering a plurality of paperboard sheets, which are adhesively bound. However, the packaging article may also be constructed of a strong resilient material such as plastic, corrugated paper, or a similar suitable material.

The packaging article product 10 as shown in FIG. 1, includes a base 12, a first section 16 and a second section 18 which are unitarily formed into a single structure. The packaging article product 10 also includes first and second sealing layers 30, 34 which are unitary layers that cover the first section 16, the base 12 and the second section 18. The sealing layers have opposed surfaces, a sealing layer first surface 31, 33 and a sealing layer second surface 32, 35.

The first section 16, the base 12 and the second section 18 each include a support member 28 disposed therein. Each support member 28 has opposing surfaces, a support member first surface 27 and a support member second surface 29. The support member 28, in a preferred embodiment, includes one or more reinforcement member 36 which are adhesively bonded together to form a unitary structure. This reinforcement member 26 adds strength to the packaging article 10 to allow it to accommodate a variety of materials. The reinforcement member 26 overlies the collapsible channel 24, which when one of the sections 16, 18 is articulated, collapses to form along with the reinforcement member 26 an elbow joint 22 therein. The elbow joint 22 allows the sections 16, 18 and the base 12 to be bent into a configuration sweeping through any angle from 0 degrees to 180 degrees depending on the requirements of a user of packaging article product 10.

Referring to FIG. 2, the collapsible channel 24 formed by two of the support members and the sealing layers 30, 34 is shown from a side elevation view. The support layers 28 are situated so as to leave a gap therebetween which defines the collapsible channel 24. Each support layer 28 is further comprised of a plurality of reinforcement layers 36 which are adhesively bound into a unitary structure. The collapsible channel 24 is shown to be reinforced by a shaping member 26 which is made of a strong but pliable material such as steel, although any pliable material importing strength to the article 10 may be used. The composition of the material of the shaping member 26 allows the shaping member to be bent into a variety of shapes, and to hold the desired shape. The shaping member 26 is shown traversing the collapsible channel 24 and is held in place using a form of adhesive between the support layer 28 and the sealing layer 30 whereby forming a reinforced, unitary structure. The benefit of the present invention is that the packaging article product 10 may be bent into various angles, and due to the strength and pliability of the shaping member 26 it will maintain the angle into which it is bent without the assistance of any other devices.

FIG. 2 further illustrates the packaging article product 10 in a flat configuration. The flat configuration is desired when the packaging article product is being shipped in bulk or stored because in a flat configuration the packaging article product 10 will take up much less space than if it were in a U-shaped, an L-shaped or other configuration shape. This is desirous because space savings typically equates to costs savings for the user of the packaging article product 10.

Referring now to FIG. 3, the packaging article product 10 is depicted in a side elevational view. The packaging article product 10 is shown in FIG. 3, in a U-shaped configuration. This configuration is achieved by bending the shaping member 26 into a 90 degree orientation. The presence of the collapsible channel 24 allows the shaping member 26 to collapse the collapsible channel 24 whereby allowing the base 12 and the second section 18 to be placed in a substantially perpendicular orientation. The first section 16 and the base 12 are also placed into a perpendicular orientation by bending the shaping member 26 at the collapsible channel 24 which joins the first section 16 and the base 12 into a unitary structure. This U-shaped orientation is used to store or ship a variety of materials. However, the packaging article product 10 may also be shaped into a variety of configurations by bending the shaping members 26 into a variety of different acute or obtuse angles. For example, bending the shaping member 26 into a 45 degree angle would allow the packaging article product 10 to be formed into a triangular shape. Conversely, by bending the shaping members 26 into a 135 degree angle we create a completely different shape which would allow the storage or shipping of a larger amount of material due to the volume within the container being increased. This is a desirable feature for the users of the packaging article product because it adds an element of flexibility to the product because different sizes and shapes of materials can be inserted into the packaging article product 10 by bending the first section or the second section at different angles depending on the user's requirements.

Figure 4:
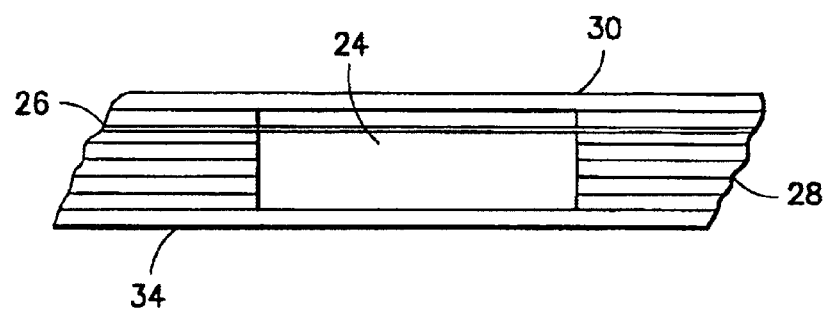
FIG. 4 is a side elevational view of a portion of the paperboard structure constructed in accordance with the invention.

Referring now to FIG. 4, we see a side view of the collapsible channel 24 formed within the sealing layer 30 and the coupling layer 34. The collapsible channel 24 is shown as being formed between the support layers 28 by orienting the support layers 28 with a gap therebetween. The shaping member 26 is shown disposed across the collapsible channel 24 and further disposed between the support layers 28 and the sealing layer 30 and being adhesively bonded thereto.

In a second embodiment, we refer again to FIG. 2 which depicts the packaging article product 10 from a side elevational view. In the second embodiment, the support layer 28 is comprised of a single material support layer 28, which is comprised of a single solid material such as plastic, foam or the like. In the second embodiment, the support layers 28 will be disposed between the sealing layer 30 and the coupling layer 34 and situated so as to leave a gap which creates a collapsible channel 24. The shaping member 26 will traverse the collapsible channel 24 and will be adhesively bonded between the support layer 28 and the sealing layer 30.

In an alternate embodiment shown in FIG. 5, the packaging article 10 generally comprises four support members 28 positioned in spaced apart relation and bound together by first and second sealing layers 30, 34. The relative position of the support members 28 and the sealing layers 30, 34 define a collapsible channel 24, which permits the two outer support members 28 and 28' to articulate about an axis (X) passing longitudinally through the collapsible channels 24. Thus, as depicted in FIG. 1, the packaging article 10 can be formed to take a square or rectangular shape by articulating each support member 28 approximately 90° about axis (X). A strong, but pliable, reinforcement member 26 is preferably positioned and fixed between other first sealing layer 30 and the support members 28 so as to overlie and further define the collapsible channels 29. Although a pair of reinforcement members 26 are shown in the FIGS., one skilled in the art will recognize that a single reinforcement member 26 that extends though both collapsible channels may be used. The reinforcement member 26 also preferably extend throughout the packaging so as to substantially overlie the whole of the collapsible channels 24, as shown in FIG. 1.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A packaging article for forming a container, comprising:
   a first sealing layer;
   a second sealing layer;
   at least three support layers said at least three support layers being disposed between said first and second sealing layers such that a first collapsible channel is formed between a first support layer and a second support layer of said at least three support layers and a second collapsible channel is formed between said first support layer and a third support layer of said at least three support layers;
   a shaping member being formed of a pliable metal disposed between said first sealing layer and said support layers such that said shaping member overlies said first and second collapsible channels.

2. The packaging article of claim 1, wherein said shaping member is bendably reinforced by said shaping member.

3. The packaging article of claim 1, wherein said sealing and support layers are formed of paperboard.

4. The packaging article of claim 1, wherein said sealing and support layers are formed of a resilient material.

5. The packaging article of claim 1, wherein said sealing and support layers are fixed by adhesive.

6. The packaging article of claim 1, wherein said shaping member maintains a substantially perpendicular shape after bending.

7. The packaging article of claim 1, wherein said shaping member is formed of two independent shaping member pieces, said first shaping member piece overlying said first collapsible channel and said second shaping member piece overlying said second collapsible channel.

8. The packaging article of claim 1, wherein said first, second and third support layers are formed into a U-shaped structure by rotating said first and third support layers by about 90 degrees about an axis passing through the respective first and second collapsible channels.

9. The packaging article of claim 8, wherein said shaping member retains said U-shaped structure.

10. The packaging article of claim 8, wherein two U-shaped rigid structures are positioned opposing each other and are interlaced to form a square or rectangular tube.

11. The packaging article of claim 1, wherein said first support layer and said second support layer are urged together to form a triangular structure.

12. The packaging article of claim 1, wherein said packaging article may be efficiently shaped or stored in a flat configuration.

13. The packaging article of claim 1, further comprising a fourth support layer disposed between said first and second sealing layers, wherein a third collapsible channel is formed between said third and fourth support layers and said third collapsible channel is overlied by a portion of said shaping member.

14. The packaging article of claim 13, wherein said packaging article is formed into a quadrilateral structure by rotating said first, third and fourth support layers about 90 degrees about said first, second and third collapsible channels.

* * * * *